United States Patent
Dahl et al.

(10) Patent No.: US 8,571,774 B2
(45) Date of Patent: Oct. 29, 2013

(54) PROPULSION SYSTEM WITH A CONTINUOUSLY VARIABLE TRANSMISSION

(71) Applicant: Caterpillar Inc., Peoria, IL (US)

(72) Inventors: Kristofor Lee Dahl, Yorkville, IL (US); Brian Douglas Hoff, East Peoria, IL (US); Richard George Ingram, St. Charles, IL (US); Michael Anthony Spielman, Jr., Brookfield, IL (US); Benjamin B. Schmuck, Glen Allen, IL (US); Alberto Martinez, Jr., Lisle, IL (US); Yaang Zhao, Surrey (CA)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/684,741

(22) Filed: Nov. 26, 2012

(65) Prior Publication Data

US 2013/0080005 A1 Mar. 28, 2013

Related U.S. Application Data

(62) Division of application No. 11/979,208, filed on Oct. 31, 2007, now Pat. No. 8,321,105.

(51) Int. Cl.
*G06G 7/00* (2006.01)

(52) U.S. Cl.
USPC .......... 701/61; 701/22; 701/51; 701/67; 701/84; 477/40; 477/47; 477/68; 477/37; 477/101; 475/76; 475/80; 475/72; 475/83; 475/78; 180/197; 180/65.7

(58) Field of Classification Search
USPC ............. 701/22, 51, 61, 67; 180/65.3, 65.7; 477/47, 40, 68
See application file for complete search history.

(56) References Cited

U.S. PATENT DOCUMENTS

| 4,720,793 | A | | 1/1988 | Watanabe et al. |
| 4,853,858 | A | | 8/1989 | Kumura |
| 5,671,137 | A | | 9/1997 | Ishino |
| 5,722,500 | A | * | 3/1998 | Toukura et al. ............... 477/40 |
| 5,931,884 | A | * | 8/1999 | Ochiai ............................ 701/51 |
| 6,135,917 | A | | 10/2000 | Takizawa et al. |
| 6,246,940 | B1 | | 6/2001 | Ochiai et al. |
| 6,311,113 | B1 | | 10/2001 | Danz et al. |
| 6,385,521 | B1 | | 5/2002 | Ito |

(Continued)

FOREIGN PATENT DOCUMENTS

| GB | 2333334 A | 7/1999 |
| JP | 62-191239 | 8/1987 |
| JP | 06-144281 | 5/1994 |
| JP | 2004-11728 | 1/2004 |

*Primary Examiner* — Redhwan K Mawari
(74) *Attorney, Agent, or Firm* — Finnegan, Henderson, Farabow, Garrett & Dunner, LLP

(57) ABSTRACT

One disclosed embodiment relates to a propulsion system for a machine. The propulsion system may include a prime mover operatively connected through a continuously variable transmission to a propulsion device. The propulsion system may also include propulsion-system controls that control an operating parameter of the continuously variable transmission, which may include adjusting the operating parameter based on operator input. Controlling the operating parameter may also include determining an adjustment limit for the operating parameter based on one or more operating conditions and applying the adjustment limit to the operating parameter to modify at least one of acceleration and jerk of the machine based on the one or more operating conditions.

18 Claims, 2 Drawing Sheets

(56) References Cited

U.S. PATENT DOCUMENTS

| | | |
|---|---|---|
| 6,548,979 B2 * | 4/2003 | Boisvert et al. ............... 318/469 |
| 6,882,909 B2 * | 4/2005 | Lee ................. 701/22 |
| 6,909,953 B2 | 6/2005 | Joe et al. |
| 7,121,967 B2 | 10/2006 | Luh |
| 7,247,122 B2 * | 7/2007 | Shah ............................. 477/68 |
| 2003/0229437 A1 * | 12/2003 | Joe et al. ........................ 701/51 |
| 2004/0049328 A1 * | 3/2004 | Lee ................. 701/22 |
| 2004/0176899 A1 * | 9/2004 | Hallowell ...................... 701/84 |
| 2006/0150624 A1 * | 7/2006 | Shah .............................. 60/445 |
| 2006/0150809 A1 | 7/2006 | Shah |
| 2006/0155448 A1 | 7/2006 | Shah |
| 2007/0027602 A1 | 2/2007 | Unno et al. |
| 2009/0112424 A1 * | 4/2009 | Dahl et al. ...................... 701/61 |

* cited by examiner

PROPULSION SYSTEM WITH A CONTINUOUSLY VARIABLE TRANSMISSION

CROSS-REFERENCE TO RELATED APPLICATIONS

This is a divisional of application Ser. No. 11/979,208, filed Oct. 31, 2007, the entire disclosure of which is incorporated herein by reference.

TECHNICAL FIELD

The present disclosure relates to propulsion systems for mobile machines and, more particularly, to propulsion systems having continuously variable transmissions.

BACKGROUND

Many mobile machines include a propulsion system with a multiple-ratio transmission operable to transmit power from a prime mover (such as an engine) to propulsion devices (such as wheels) at any of a plurality of optional drive ratios. Some multiple-ratio transmissions have a step-change configuration, meaning that the transmission has a finite set of discrete drive ratios at which it can transmit power. Other multiple-ratio transmissions, known as continuously variable transmissions, have a configuration allowing adjustment of the transmission's drive ratio through a continuous range. The advantages associated with continuously variable transmissions include the decoupling of the transmission input speed from the transmission output speed and the ability to rapidly adjust the drive ratio, the output speed, and the amount of torque output by the transmission. This may help the propulsion system meet operator requests for abrupt changes in the travel speed of the mobile machine. Unfortunately, the rapid adjustment capability of continuously variable transmissions creates the possibility of undesirably abrupt adjustment in response to operator inputs.

U.S. Pat. No. 5,931,884 to Ochiai ("the '884 patent") discloses a method of controlling a continuously variable transmission, including calculating an upper limit for the rate at which the drive ratio of the continuously variable transmission changes. The '884 patent expresses concerns that some control strategies for continuously variable transmissions may produce undesirable deceleration in particular circumstances by changing the drive ratio of the continuously variable transmission too rapidly and thereby causing negative torque at the output shaft of the continuously variable transmission. In order to address this concern, the control method of the '884 patent involves calculating the maximum rate at which the drive ratio of the continuously variable transmission can change without causing its output torque to drop to or below zero. The control method of the '884 patent imposes this calculated maximum rate as a limit on the adjustment of the drive ratio of the continuously variable transmission, thereby preventing deceleration due to rapid adjustment of the continuously variable transmission.

Although the control method of the '884 patent involves calculating and imposing a limit on the rate of change of the drive ratio of the continuously variable transmission, certain disadvantages persist. For example, the adjustment limit imposed by the control method of the '884 patent limits acceleration in the same manner in all circumstances. Thus, the '884 patent fails to recognize that the desirable limits on acceleration may vary depending on various operating conditions.

The propulsion system and control methods of the present disclosure solve one or more of the problems set forth above.

SUMMARY OF THE INVENTION

One disclosed embodiment relates to a propulsion system for a machine. The propulsion system may include a prime mover operatively connected through a continuously variable transmission to a propulsion device. The propulsion system may also include propulsion-system controls that control an operating parameter of the continuously variable transmission, which may include adjusting the operating parameter based on operator input. Controlling the operating parameter may also include determining an adjustment limit for the operating parameter based on one or more operating conditions and applying the adjustment limit to the operating parameter to modify at least one of acceleration and jerk of the machine based on the one or more operating conditions.

Another embodiment relates to a method of propelling a machine with a propulsion system. The propulsion system may include a prime mover operatively connected through a continuously variable transmission to a propulsion device and propulsion-system controls. The machine may also have one or more other machine systems. The method may include transmitting power from the prime mover to the propulsion device with the continuously variable transmission while controlling a first operating parameter of the continuously variable transmission with the propulsion-system controls. Controlling the first operating parameter with the propulsion-system controls may include adjusting the operating parameter based on operator input. Controlling the first operating parameter with the propulsion-system controls may also include determining an adjustment limit for the first operating parameter based on one or more second operating parameters of the one or more other systems of the machine. Additionally, controlling the first operating parameter with the propulsion-system controls may include applying the adjustment limit to the first operating parameter.

A further disclosed embodiment relates to a propulsion system for a machine. The propulsion system may include a prime mover operatively connected through a continuously variable transmission to a propulsion device. Additionally, the propulsion system may include propulsion-system controls that control acceleration and jerk of the machine at least in part by controlling an operating parameter of the continuously variable transmission. Controlling the operating parameter of the continuously variable transmission may include adjusting the operating parameter based on operator input. Additionally, controlling the operating parameter may include limiting at least one of the acceleration and jerk of the machine by determining an adjustment limit for the operating parameter and applying the adjustment limit to the operating parameter, the adjustment limit being determined based on at least one of the direction of travel of the machine and the direction of travel requested by an operator.

DETAILED DESCRIPTION

Figure 1:
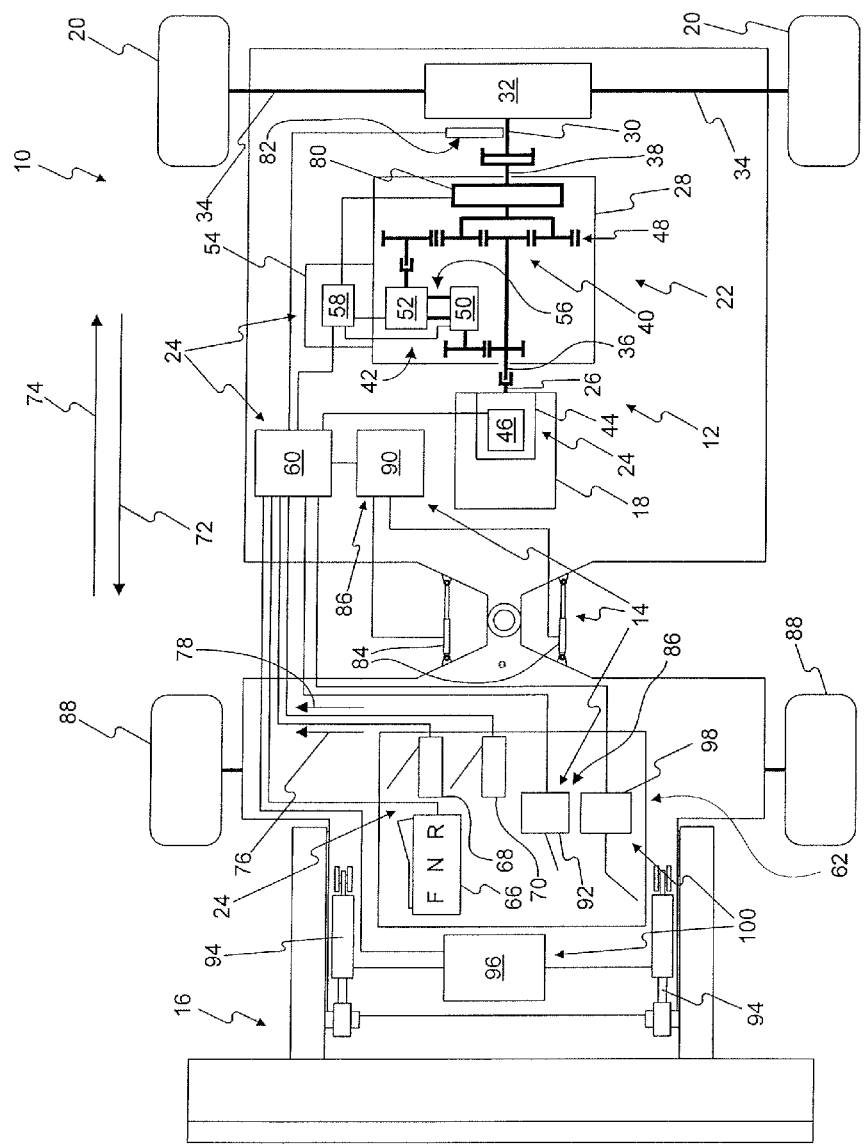
FIG. 1 is a diagrammatic illustration of a machine having one embodiment of a propulsion system according to the present disclosure.

FIG. 1 illustrates a mobile machine 10 having one embodiment of a propulsion system 12 according to the present disclosure. In addition to propulsion system 12, mobile machine 10 may have various other systems, including, but not limited to, a steering system 14 and an implement 16.

Propulsion system 12 may include a prime mover 18, propulsion devices 20, a drive train 22, and propulsion-system controls 24. Prime mover 18 may be any type of component operable to provide power for propelling mobile machine 10. For example, prime mover 18 may be a diesel engine, a gasoline engine, a gaseous-fuel-driven engine, or a turbine engine. Prime mover 18 may have a rotary output member 26 for supplying rotary mechanical power. Prime mover 18 may also include prime-mover controls 44. Prime-mover controls 44 may include any component or components operable to control one or more aspects of the operation of prime mover 18. In some embodiments, prime-mover controls 44 may include a prime-mover controller 46 operatively connected to various sensors and/or actuators (not shown) for monitoring and controlling prime mover 18. Prime-mover controller 46 may include one or more processors (not shown) and one or more memory devices (not shown).

Propulsion devices 20 may include any type of components operable to propel mobile machine 10 by receiving power from one or more other components of propulsion system 12 and apply that power to the environment surrounding mobile machine 10. For example, as shown in FIG. 1, propulsion devices 20 may include wheels. Propulsion devices 20 may also include various other types of devices in addition to, or in place of, wheels, including, but not limited to, track units and/or propellers.

Drive train 22 may include any component or components operable to transfer power from prime mover 18 to propulsion devices 20 to propel mobile machine 10. For example, drive train 22 may include a continuously variable transmission 28, a drive shaft 30, a differential unit 32, and axle shafts 34 connected between prime mover 18 and propulsion devices 20. Continuously variable transmission 28 may have a rotary input member 36 and a rotary output member 38. Rotary input member 36 may connect directly or indirectly to rotary output member 26 of prime mover 18. Drive shaft 30, differential unit 32, and axle shafts 34 may connect rotary output member 38 to propulsion devices 20.

Continuously variable transmission 28 may have any configuration that allows transferring power between rotary input member 36 and rotary output member 38 while varying the ratio of the speed of rotary input member 36 to the speed of rotary output member 38 through a continuous range. In some embodiments, continuously variable transmission 28 may have a mechanical power-transfer path 40 and a hydraulic power-transfer path 42 connected in parallel between rotary input member 36 and rotary output member 38. Mechanical power-transfer path 40 may include a planetary gear set 48 connected between rotary input member 36 and rotary output member 38. Rotary input member 36 may, for example, connect directly or indirectly to the sun gear of planetary gear set 48, and the planet carrier of planetary gear set 48 may connect directly or indirectly to rotary output member 38.

Hydraulic power-transfer path 42 may include a hydraulic pump 50, a hydraulic motor 52, and a fluid-transfer system 56 for delivering hydraulic fluid pumped by hydraulic pump 50 to hydraulic motor 52. Fluid-transfer system 56 may include various conduits, valves, reservoirs, and/or other known hydraulics components. Hydraulic pump 50 may connect to rotary input member 36. Hydraulic motor 52 may, for example, connect to the ring gear of planetary gear set 48. This connection of rotary input member 36, hydraulic motor 52, and rotary output member 38 to planetary gear set 48 makes the speed of rotary input member 36, the speed of hydraulic motor 52, and the speed of rotary output member 38 interdependent.

Continuously variable transmission 28 may also include a reverser mechanism 80 connected between planetary gear set 48 and rotary output member 38. Reverser mechanism 80 may have one operating state that results in rotary output member 38 rotating in the same direction as rotary input member 36, and reverser mechanism 80 may have another operating state that results in rotary output member 38 rotating in a direction opposite rotary input member 36. Thus, one operating state of reverser mechanism 80 may allow propulsion of mobile machine 10 in a forward direction 72, and another operating state of reverser mechanism 80 may allow propulsion of mobile machine 10 in a reverse direction 74. Reverser mechanism 80 may have various combinations of power-transfer components, including, but not limited to, gears, pulleys, sprockets, chains, and/or clutches arranged in various manners.

Continuously variable transmission 28 may also include transmission controls 54. Transmission controls 54 may include any component or components operable to control one or more parameters of the operation of continuously variable transmission 28. Transmission controls 54 may, for example, include a transmission controller 58 operatively connected to various components of continuously variable transmission 28. Transmission controller 58 may include one or more processors (not shown) and one or more memory devices (not shown). Transmission controller 58 may be operatively connected to one or more components of hydraulic power-transfer path 42 in a manner enabling transmission controller 58 to control the speed and power output of hydraulic motor 52. Transmission controller 58 may, for example, be operatively connected to hydraulic pump 50 and hydraulic motor 52 in a manner enabling transmission controller 58 to control the displacement of hydraulic pump 50 and the displacement of hydraulic motor 52. By controlling the operating speed and power output of hydraulic motor 52, transmission controller 58 may control the ratio of the speed of rotary input member 36 to the speed of rotary output member 38, as well as the speed and torque output of rotary output member 38. Transmission controller 58 may also be operatively connected to reverser mechanism 80, such that transmission controller 58 may control whether rotary output member 38 rotates in the same direction as, or opposite to, rotary input member 36.

Propulsion-system controls 24 may include prime-mover controls 44, transmission controls 54, a master controller 60, and one or more operator-input devices of an operator interface 62 of mobile machine 10. Master controller 60 may include one or more processors (not shown) and one or more memory devices (not shown). Master controller 60 may receive information from various sources.

In some embodiments, master controller 60 may receive input from the operator-input devices of propulsion-system controls 24. These operator-input devices may include, for example, a FORWARD/NEUTRAL/REVERSE selector 66, an accelerator pedal 68, and a decelerator pedal 70. An operator of mobile machine 10 may select the "FORWARD" operating state of FORWARD/NEUTRAL/REVERSE selector 66 to request propulsion of mobile machine 10 in forward direction 72. Conversely, the operator may select the "REVERSE" operating state of FORWARD/NEUTRAL/REVERSE selector 66 to request propulsion of mobile machine 10 in reverse direction 74. Alternatively, the operator may select the "NEUTRAL" operating state of FORWARD/NEUTRAL/REVERSE selector 66 to request that propulsion system 12 not propel mobile machine 10 in either forward direction 72 or reverse direction 74.

With the FORWARD/NEUTRAL/REVERSE selector 66 in its FORWARD or REVERSE operating state, accelerator pedal 68 and decelerator pedal 70 may allow the operator to indicate how rapidly he desires propulsion system 12 to propel mobile machine 10 in the chosen direction. Accelerator pedal 68 may generate a signal 76 indicating how far the operator has depressed it from its default position. Similarly, decelerator pedal 70 my generate a signal 78 indicating how far the operator has depressed it from its default position. Generally, master controller 60 may interpret increased depression of accelerator pedal 68 as a request for increased speed in the chosen direction and increased depression of decelerator pedal 70 as a request for decreased speed in the chosen direction. In some embodiments, master controller 60 may consider signals 76, 78 collectively as the indication of the propulsion speed desired by the operator. In such embodiments, master controller 60 may consider any depression of decelerator pedal 70 as at least partially offsetting any depression of accelerator pedal 68 and vice versa, with the relationship between signals 76, 78 defining the desired propulsion speed.

In addition to operator-input devices, various other components and/or systems may provide information to master controller 60. For example, a speed/direction sensor 82 may provide master controller 60 a signal indicating the travel speed of mobile machine 10, as well as whether mobile machine 10 is traveling in forward direction 72 or in reverse direction 74. Master controller 60 may also receive signals from various other sensors (not shown), including, but not limited to, other speed/direction sensors, position sensors, pressure sensors, and/or temperature sensors.

Master controller 60 may also be operatively connected to prime-mover controls 44 and transmission controls 54. For example, master controller 60 may be communicatively linked to prime-mover controller 46 of prime-mover controls 44, as well as to transmission controller 58 of transmission controls 54. This may allow master controller 60 to coordinate control of prime mover 18 and continuously variable transmission 28 by receiving information from and sending control commands to prime-mover controller 46 and transmission controller 58.

Propulsion system 12 is not limited to the configuration shown in FIG. 1. For example, continuously variable transmission 28 may have a different configuration. Continuously variable transmission 28 may include components not shown in FIG. 1, and/or continuously variable transmission 28 may omit one or more of the components shown in FIG. 1. In some embodiments, continuously variable transmission 28 may include provisions for discrete changes in the drive ratio within various portions of mechanical power-transfer path 40 and/or in other portions of continuously variable transmission 28. Additionally, in some embodiments, in place of hydraulic power-transfer path 42, continuously variable transmission 28 may have an electrical power-transfer path parallel with mechanical power-transfer path 40. Such an embodiment of continuously variable transmission 28 may include an electric generator, an electric motor, and an electrical power-transfer circuit in place of hydraulic pump 50, hydraulic motor 52, and fluid-transfer system 56, respectively.

Additionally, in some embodiments, continuously variable transmission 28 may not have parallel power-transfer paths. For example, continuously variable transmission 28 may have a single mechanical power-transfer path. Alternatively, continuously variable transmission 28 may be a conventional hydrostatic transmission. Similarly, continuously variable transmission 28 may include only an electrical power-transfer path that includes an electric generator connected directly or indirectly to rotary input member 36 and an electric motor connected directly or indirectly to rotary output member 38.

Drive train 22 may also have continuously variable transmission 28 connected between rotary output member 26 of prime mover 18 and propulsion devices 20 differently than shown in FIG. 1. For example, drive train 22 may include various additional components connected between rotary input member 36 of continuously variable transmission 28 and rotary output member 26 of prime mover 18, including, but not limited to, one or more of clutches, fluid couplers, gears, pulleys, belts, sprockets, and chains. Similarly, drive train 22 may have additional power-transfer components connected between rotary output member 38 of continuously variable transmission 28 and propulsion devices 20, and/or drive train 22 may omit one or more of drive shaft 30, differential unit 32, and axle shafts 34.

Additionally, propulsion-system controls 24 may have a different configuration. For example, in combination with, or in place of, FORWARD/NEUTRAL/REVERSE selector 66, accelerator pedal 68, and decelerator pedal 70, propulsion-system controls 24 may include various other operator-input devices with which an operator may indicate one or more aspects of how the operator desires propulsion system 12 to propel mobile machine 10. Additionally, propulsion-system controls 24 may omit one or more of prime-mover controller 46, transmission controller 58, and master controller 60. Furthermore, propulsion-system controls 24 may include various other types of control components, such as hardwired control circuits, in addition to, or in place of, one or more of prime-mover controller 46, transmission controller 58, and master controller 60.

Steering system 14 may include any component or components operable to control whether, in what direction, and how sharply mobile machine 10 turns while traveling in forward direction 72 or reverse direction 74. For example, steering system 14 may include steering actuators 84 and steering-system controls 86. Under the control of steering-system controls 86, steering actuators 84 may interact with other components of mobile machine 10 in various manners to control whether, in what direction, and how sharply mobile machine 10 turns. In some embodiments, steering actuators 84 may control the direction of front wheels 88 of mobile machine 10 relative to propulsion devices 20.

Steering-system controls 86 may, for example, include actuator controls 90, a steering-input device 92 of operator interface 62, and master controller 60. Actuator controls 90 may include any component or components operable to control the operation of steering actuators 84. Steering-input device 92 may include any component or components that an operator may use to indicate how the operator wishes to steer mobile machine 10. For example, steering-input device 92 may include a joystick. Master controller 60 may be operatively connected to steering-input device 92 and actuator controls 90. Accordingly, master controller 60 may indirectly control steering actuators 84 based on information from steering-input device 92.

Steering system 14 is not limited to the configuration shown in FIG. 1. Steering system 14 may employ an approach other than controlling the direction of front wheels 88 to turn mobile machine 10. For example, steering system 14 may steer mobile machine 10 in a skid-steer manner. Additionally, steering system 14 may have steering-input device 92 connected directly to actuator controls 90, rather than having master controller 60 control actuator controls 90 based on information from steering-input device 92. Furthermore, in some embodiments, steering system 14 may omit steering actuators 84 and actuator controls 90, requiring the operator to provide the force to steer mobile machine 10.

Implement 16 may be any type of device configured to perform one or more tasks other than propelling mobile machine 10. For example, as shown in FIG. 1, implement 16 may be a front-end loader. Implement 16 may include one or more actuators 94 that power it, and mobile machine 10 may include implement controls 96 for controlling actuators 94 to control implement 16. Implement controls 96 may include an implement-input device 98 of operator interface 62, actuator controls 100, and master controller 60. Implement-input device 98 may include any component or components that an operator can use to indicate how the operator wants to operate implement 16, including, but not limited to, one or more handles, pedals, and/or buttons. Actuator controls 100 may include any component or components operable to control actuators 94. Master controller 60 may be operatively connected to implement-input device 98 and actuator controls 100, so that master controller 60 may control actuators 94 through actuator controls 100 in order to operate implement 16 in accordance with input from implement-input device 98.

Implement 16 and implement controls 96 are not limited to the configuration shown in FIG. 1. Implement 16 may be, for example, a type of implement other than a front-end loader, such as an excavating tool, a hoist, a demolition tool, or the like. Implement controls 96 may have implement-input device 98 connected directly to actuator controls 100, rather than employing master controller 60 to control actuator controls 100 based on information from implement-input device 98. Additionally, implement controls 96 may include other implement-input devices (not shown) in addition to implement-input device 98.

Mobile machine 10 is not limited to the configuration shown in FIG. 1. For example, mobile machine 10 may have propulsion system 12, steering system 14, and implement 16 arranged in different manners. Mobile machine 10 may also include various systems not shown in FIG. 1. In some embodiments, mobile machine 10 may include other implements in addition to implement 16. Alternatively, mobile machine 10 may omit implement 16. Similarly, mobile machine 10 may omit steering system 14.

INDUSTRIAL APPLICABILITY

Propulsion system 12 may have application for propelling any mobile machine 10. Prime mover 18 may provide power to propel mobile machine 10 by rotating rotary input member 36 of continuously variable transmission 28 with rotary output member 26. Continuously variable transmission 28 may transfer at least a portion of this power from rotary input member 36 to rotary output member 38. Propulsion devices 20 may receive the power output by rotary output member 38 and apply that power to the environment around mobile machine 10, thereby propelling mobile machine 10.

While propulsion system 12 propels mobile machine 10 in this manner, propulsion-system controls 24 may control the direction and magnitude of acceleration of mobile machine 10, as well as the jerk of mobile machine 10 (the rate of change of the acceleration). To do so, propulsion-system controls 24 may control various operating parameters of propulsion system 12, including, but not limited to, one or more operating parameters of prime mover 18 and/or one or more operating parameters of continuously variable transmission 28. For example, propulsion-system controls 24 may control how much power rotary output member 38 of continuously variable transmission 28 outputs by adjusting the operation of continuously variable transmission 28 and/or prime mover 18 to control the speed and torque output of rotary output member 38.

Generally, propulsion-system controls 24 may control the power that rotary output member 38 provides (and thus the acceleration and jerk of mobile machine 10) in accordance with operator inputs. For example, when the operator requests an increase or decrease in speed, propulsion-system controls 24 may adjust the torque output of rotary output member 38 by an amount based on the magnitude of the requested speed increase or decrease. Similarly, when mobile machine 10 is traveling in forward direction 72 or reverse direction 74 and the operator manipulates FORWARD/NEUTRAL/REVERSE selector 66 to request propulsion in the opposite direction, propulsion-system controls 24 may change the output torque provided by rotary output member 38. In such circumstances, propulsion-system controls 24 may, for example, adjust the operation of continuously variable transmission 28 and/or prime mover 18 to change the direction of the torque output by rotary output member 38 to first decelerate mobile machine 10 to a stop and then accelerate mobile machine 10 in the newly requested forward direction 72 or reverse direction 74. When changing the direction of torque output by rotary output member 38 in response to such an operator-requested directional shift, propulsion-system controls 24 may control the magnitude of the output torque based at least in part on the signals 76, 78 from accelerator pedal 68 and decelerator pedal 70.

Propulsion-system controls 24 may, however, impose a limit on adjustment of the continuously variable transmission 28 and/or prime mover 18 in response to operator requests for acceleration, deceleration, and directional shifts. By imposing such a limit, propulsion-system controls 24 may avoid excessive levels of acceleration and jerk. As explained in detail below, propulsion-system controls 24 may impose this limit in a manner that limits the acceleration and/or jerk of mobile machine 10 differently in some circumstances than in other circumstances. By doing so, propulsion-system controls 24 may allow relatively high levels of acceleration and jerk in circumstances where the operator expects and desires aggressive response from propulsion system 12, while limiting acceleration and jerk to lower values in circumstances where the operator does not expect or desire such aggressive operation.

Figure 2:
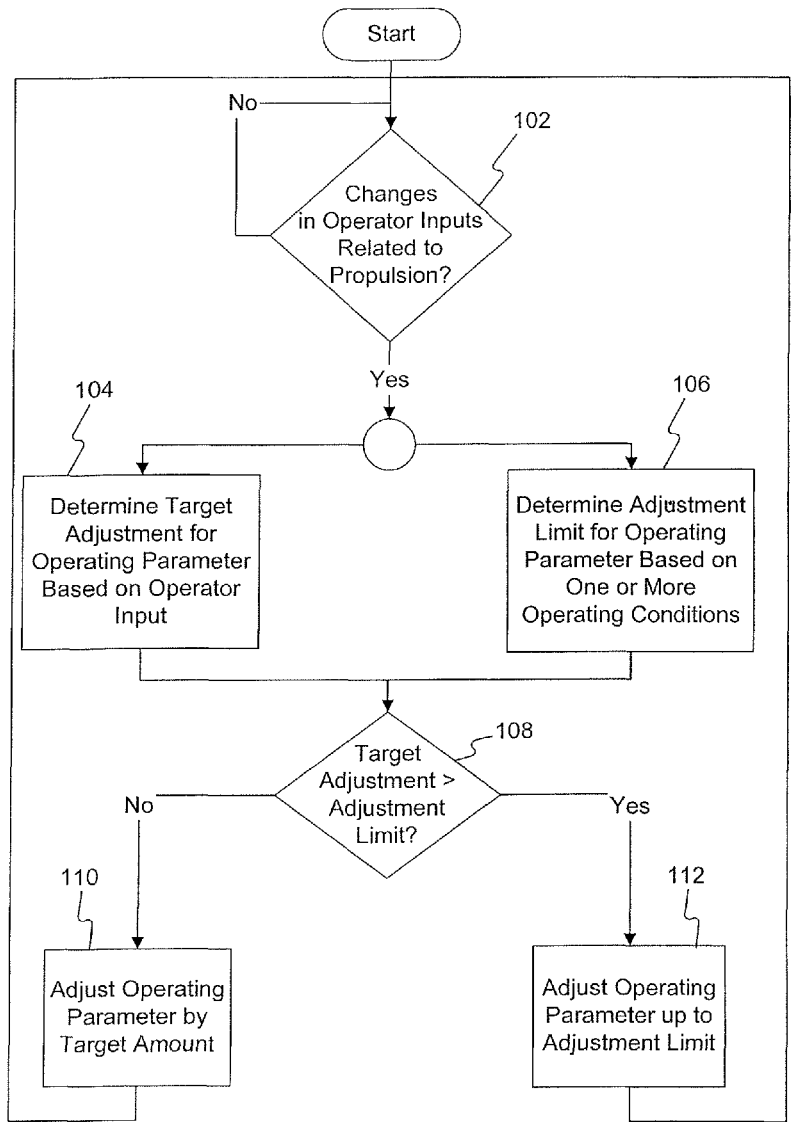
FIG. 2 is a flow chart illustrating one embodiment of a control method according to the present disclosure.

Propulsion-system controls 24 may employ various methods to limit acceleration and/or jerk of mobile machine 10 differently in some circumstances than in other circumstances. FIG. 2 illustrates one embodiment of a control method that propulsion-system controls 24 may use for this purpose. In this exemplary method, propulsion-system controls 24 may continually monitor for changes in operator inputs related to propulsion (step 102). When propulsion-system controls 24 detect a change in operator inputs related to propulsion, propulsion-system controls 24 may determine a target adjustment for an operating parameter of continuously variable transmission 28 based on the change in the operator inputs (step 104). For example, propulsion-system controls 24 may determine a target adjustment for a parameter of the power output by rotary output member 38 in response to changed operator inputs relating to propulsion. In some embodiments, propulsion-system controls 24 may determine a target adjustment in the torque output of rotary output member 38 in response to an operator request for increased acceleration, increased deceleration, and/or a directional shift.

Simultaneously, propulsion-system controls 24 may determine an adjustment limit for the operating parameter of the continuously variable transmission 28 based on one or more operating conditions (step 106). The adjustment limit may be, for example, a limit on the rate of change of the operating parameter, such as a limit on the rate of change of the torque output of rotary output member 38. After calculating the target adjustment and the adjustment limit for the operating parameter, propulsion-system controls 24 may determine whether the target adjustment exceeds the adjustment limit (step 108). If not, propulsion-system controls 24 may adjust the operating parameter by the target amount (step 110). On the other hand, if the target adjustment exceeds the adjustment limit, propulsion-system controls 24 may impose the adjustment limit and adjust the operating parameter up to the adjustment limit (step 112) instead of implementing the target adjustment. By limiting the rate of change of the torque output of rotary output member 38 or some other parameter of the power output by rotary output member 38, propulsion-system controls 24 may limit the acceleration and/or jerk of mobile machine 10. Thus, by determining and applying the adjustment limit in the manner discussed above, propulsion-system controls 24 may modify the acceleration and/or jerk of mobile machine 10 based on the one or more operating conditions used to determine the adjustment limit.

By calculating the adjustment limit based on one or more operating conditions, propulsion-system controls 24 may tailor the adjustment limit and the associated limit on the acceleration and/or jerk of the mobile machine 10 to the circumstances at hand. Propulsion-system controls 24 may use various operating conditions to determine the adjustment limit. In some embodiments, propulsion-system controls 24 may determine the adjustment limit based at least in part on whether mobile machine 10 is traveling in forward direction 72 or reverse direction 74. With all other factors being equal, propulsion-system controls 24 may set the adjustment limit higher if mobile machine 10 is traveling in forward direction 72 than if mobile machine 10 is traveling in reverse direction 74.

Propulsion-system controls 24 may also base the adjustment limit at least partially on whether the target adjustment of the operating parameter involves an increase or decrease in the quantity of torque output at rotary output member 38. In some embodiments, all other factors being equal, if the target adjustment to the operating parameter involves an increase in the quantity of torque output at rotary output member 38, propulsion-system controls 24 may set the adjustment limit lower than if the target adjustment to the operating parameter involves a decrease in the quantity of torque output at rotary output member 38. An operator may find relatively abrupt decreases in the output torque at rotary output member 38 more agreeable than relatively abrupt increases in the output torque at rotary output member 38.

In some embodiments, to determine the adjustment limit, propulsion-system controls 24 may consider the direction of travel in combination with whether mobile machine 10 is accelerating or decelerating. In other words, propulsion-system controls 24 may set the adjustment limit dependent on whether mobile machine 10 is (1) traveling in forward direction 72 and accelerating, (2) traveling in forward direction 72 and decelerating, (3) traveling in reverse direction 74 and accelerating, or (4) traveling in reverse direction 74 and decelerating. Propulsion-system controls 24 may set the adjustment limit differently for each of these four different circumstances.

Propulsion-system controls 24 may also set the adjustment limit dependent at least in part on whether the direction of travel requested by the operator matches the actual direction of travel of mobile machine 10. As discussed above, when mobile machine 10 is traveling either in forward direction 72 or reverse direction 74, the operator may change the operating state of FORWARD/NEUTRAL/REVERSE selector 66 to request propulsion in the opposite direction, at which time the requested direction of travel generally will not match the actual direction of travel. When the operator makes such a request for a direction shift, propulsion-system controls 24 may determine the adjustment limit differently than when the actual direction of travel of mobile machine 10 matches the requested direction of travel. In some embodiments, all other factors being equal, propulsion-system controls 24 may set the adjustment limit higher when the actual direction of travel does not match the requested direction of travel than when the actual direction of travel does match the requested direction of travel.

Propulsion-system controls 24 may also determine the adjustment limit based on the travel speed of mobile machine 10. For example, in some embodiments, all other factors being equal, propulsion-system controls 24 may set the adjustment limit lower with increasing travel speed of mobile machine 10.

Propulsion-system controls 24 may also determine the adjustment limit based at least in part on one or more operating conditions of one or more systems other than propulsion system 12. For example, propulsion-system controls 24 may set the adjustment limit based at least in part on one or more operating parameters of steering system 14, such as an operating parameter indicative of whether and how sharply mobile machine 10 is turning. In some embodiments, all other factors being equal, the more sharply mobile machine 10 is turning, the lower propulsion-system controls 24 may set the adjustment limit. Additionally, propulsion-system controls 24 may determine the adjustment limit based at least in part on one or more operating conditions of implement 16. For example, in embodiments where implement 16 is a front-end loader, propulsion-system controls 24 may set the adjustment limit based on how high the operator has raised the bucket thereof.

Propulsion-system controls 24 may use various combinations of the factors discussed above and/or various other operating conditions to determine the adjustment limit. In some embodiments, propulsion-system controls 24 may always use the same factors to determine the adjustment limit. Alternatively, propulsion-system controls 24 may use one or more factors only some of the time when determining the adjustment limit.

Methods that propulsion-system controls 24 may use to limit the acceleration and/or jerk of mobile machine 10 differently in different circumstances are not limited to the examples discussed above. For example, propulsion-system controls 24 may implement different relationships between the adjustment limit and the operating conditions used to determine the adjustment limit. Additionally, propulsion-system controls 24 may limit the acceleration and/or jerk of mobile machine 10 by setting a limit on adjustment of an operating parameter of continuously variable transmission 28 other than the torque output by rotary output member 38. Furthermore, in determining and imposing the adjustment limit, propulsion-system controls 24 may perform the actions shown in FIG. 2 in different orders and/or perform other actions in addition to, or in place of, the actions shown in FIG. 2.

It will be apparent to those skilled in the art that various modifications and variations can be made in the disclosed propulsion system and control methods without departing from the scope of the disclosure. Other embodiments of the disclosed propulsion system and control methods will be apparent to those skilled in the art from consideration of the specification and practice of the propulsion system and control method disclosed herein. It is intended that the specification and examples be considered as exemplary only, with a true scope of the disclosure being indicated by the following claims and their equivalents.

What is claimed is:

1. A method of propelling a machine with a propulsion system having a prime mover operatively connected through a continuously variable transmission to a propulsion device, propulsion-system controls, and one or more other machine systems, the method comprising:

transmitting power from the prime mover to the propulsion device with the continuously variable transmission while controlling a first operating parameter of the continuously variable transmission with the propulsion-system controls, including adjusting the first operating parameter based on operator input, determining a magnitude of an adjustment limit for the first operating parameter based on one or more second operating parameters of the one or more other systems of the machine, including determining the magnitude of the adjustment limit based at least in part on whether the machine is travelling in a forward direction or in a reverse direction, and applying the adjustment limit to the first operating parameter, wherein:

the one or more other systems of the machine include a steering system; and determining the magnitude of the adjustment limit for the first operating parameter based on one or more second operating parameters of the one or more other systems of the machine includes determining the magnitude of the adjustment limit for the first operating parameter based on an operating parameter of the steering system.

2. The method of claim 1, wherein:

the one or more other systems of the machine include an implement; and determining the magnitude of the adjustment limit for the first operating parameter based on one or more second operating parameters of the one or more other systems of the machine includes determining the magnitude of the adjustment limit for the first operating parameter based on an operating parameter of the implement.

3. The method of claim 1, wherein determining the magnitude of the adjustment limit for the first operating parameter includes determining the magnitude of the adjustment limit based on one or more third operating parameters of the propulsion system in addition to the one or more second operating parameters of the one or more other systems of the machine.

4. The method of claim 1, wherein the first operating parameter is a parameter of power that the continuously variable transmission outputs.

5. The method of claim 1, wherein the first operating parameter is an amount of torque that the continuously variable transmission outputs.

6. The method of claim 1, wherein the adjustment limit is a limit on the rate of change of the first operating parameter.

7. A method of propelling a machine with a propulsion system having a prime mover operatively connected through a continuously variable transmission to a propulsion device, propulsion-system controls, and one or more other machine systems, the method comprising:

transmitting power from the prime mover to the propulsion device with the continuously variable transmission while controlling a first operating parameter of the continuously variable transmission with the propulsion-system controls, including determining a target adjustment for the first operating parameter based on operator input;

determining a magnitude of an adjustment limit for the first operating parameter based on one or more second operating parameters of the one or more other systems of the machine, including determining the magnitude of the adjustment limit based at least in part on whether the machine is travelling in a forward direction or in a reverse direction; and adjusting the first operating parameter based on the target adjustment while applying the adjustment limit to the first operating parameter, including if a magnitude of the target adjustment is smaller than the magnitude of the adjustment limit, adjusting the first operating parameter by the magnitude of the target adjustment, and if the magnitude of the target adjustment is greater than the magnitude of the adjustment limit, adjusting the first operating parameter up to the magnitude of the adjustment limit.

8. The method of claim 7, wherein:

the one or more other systems of the machine include a steering system; and determining the magnitude of the adjustment limit for the first operating parameter based on one or more second operating parameters of the one or more other systems of the machine includes determining the magnitude of the adjustment limit for the first operating parameter based on an operating parameter of the steering system.

9. The method of claim 7, wherein:

the one or more other systems of the machine include an implement; and determining the magnitude of the adjustment limit for the first operating parameter based on one or more second operating parameters of the one or more other systems of the machine includes determining the magnitude of the adjustment limit for the first operating parameter based on an operating parameter of the implement.

10. The method of claim 7, wherein determining the magnitude of the adjustment limit for the first operating parameter includes determining the magnitude of the adjustment limit based on one or more third operating parameters of the propulsion system in addition to the one or more second operating parameters of the one or more other systems of the machine.

11. The method of claim 7, wherein the first operating parameter is a parameter of power that the continuously variable transmission outputs.

12. The method of claim 7, wherein the first operating parameter is an amount of torque that the continuously variable transmission outputs.

13. The method of claim 7, wherein the adjustment limit is a limit on the rate of change of the first operating parameter.

14. A method of propelling a machine with a propulsion system having a prime mover operatively connected through a continuously variable transmission to a propulsion device, propulsion-system controls, and one or more other machine systems, the method comprising:

transmitting power from the prime mover to the propulsion device with the continuously variable transmission while controlling a first operating parameter of the continuously variable transmission with the propulsion-system controls, including adjusting the first operating parameter based on operator input, determining a magnitude of an adjustment limit for the first operating parameter based on one or more second operating parameters of the one or more other systems of the machine, including determining the magnitude of the adjustment limit based at least in part on whether the machine is travelling in a forward direction or in a reverse direction, and applying the adjustment limit to the first operating parameter, wherein:

the one or more other systems of the machine include an implement; and determining the magnitude of the adjustment limit for the first operating parameter based on one or more second operating parameters of the one or more other systems of the machine includes determining the magnitude of the adjustment limit for the first operating parameter based on an operating parameter of the implement.

15. The method of claim 14, wherein determining the magnitude of the adjustment limit for the first operating parameter includes determining the magnitude of the adjustment limit based on one or more third operating parameters of the propulsion system in addition to the one or more second operating parameters of the one or more other systems of the machine.

16. The method of claim 14, wherein the first operating parameter is a parameter of power that the continuously variable transmission outputs.

17. The method of claim 14, wherein the first operating parameter is an amount of torque that the continuously variable transmission outputs.

18. The method of claim 14, wherein the adjustment limit is a limit on the rate of change of the first operating parameter.

* * * * *